3,074,158
FLUX COMPOSITION AND METHOD OF USING
SAME TO SOLDER ALUMINUM
Walter D. Finnegan, Spokane, Wash., assignor to Kaiser Aluminum & Chemical Corporation, Oakland, Calif., a corporation of Delaware
No Drawing. Filed Mar. 15, 1955, Ser. No. 494,573
13 Claims. (Cl. 29—495)

This invention relates to soldering fluxes and more particularly to soldering fluxes adapted for use in soldering aluminum metals. A specific embodiment of this invention contemplates a soldering flux for use in dip soldering stranded aluminum cable. Another specific embodiment contemplates a soldering flux for use in soldering aluminum can seams. This application is a continuation-in-part of my co-pending application Serial Number 414,893, filed March 8, 1954, now abandoned.

In soldering aluminum and aluminum alloys the basic difficulty to be overcome is the removal of an oxide film which is formed on the surface of the metal and which, therefore, interferes with a wetting of the underlying metal by the solder. In order to establish a metal-to-metal contact between the metal being soldered and the solder, the oxide film must be removed either mechanically or chemically. The function of the flux is its use as a chemical means for removing the oxide film.

Another problem presented, particularly in the case of stranded cable, is to facilitate solder flow between the various strands so as to produce a solder connection between all of the strands. Accordingly, a highly desirable property in a flux is the ability to promote a spreading or flow of the solder over the prepared surface. Another desirable property of the flux is fluidity. A further important property which characterizes a good flux is that it should only superficially attack the metal and yet loose the oxide film and then dissolve or otherwise displace any loosened oxide particles. Still another required property is that the flux should not leave a corrosive residue. Such a corrosive residue presents particular problems with regard to the soldering of aluminum cable. As pointed out above, a good solder flux must facilitate solder flow between the various strands and in order to do so the flux moves up the spaces between the strands by capillary attraction. Thus, generally after soldering if a residue remains there will be such a residue just beyond the solder covered portion or joint and within the strands of the cable. Where such a residue is corrosive, the strands beyond the solder covered portion will corrode and eventually the joint will be severed at this point.

While it is true that many fluxes such as zinc chloride dissolved in alcohol have been employed in the prior art and that such fluxes are quite satisfactory as principal reaction agents for removal of the oxide film from aluminum, such fluxes nevertheless fail to insure a good flow of solder or to form a protective covering excluding oxygen from the area being soldered. Therefore, for soldering aluminum parts, a flux such as zinc chloride alone dissolved in a suitable solvent is not satisfactory. Dip soldering stranded aluminum cable presents further difficult problems in addition to those involved in soldering flat surface aluminum metals.

Examples of the application of dip soldering to stranded aluminum cables are (1) joining of small strands of aluminum battery cable wire into an electrical homogeneous unit; (2) soldering terminals to multiple strand aluminum cable. For such applications the ends of the stranded cable are assembly dipped in the flux followed by immersion in a pot of molten solder. In such application if a normal flux of the prior art is employed, generally an unsoldered solder joint results. When normal proprietary fluxes are used in dip soldering stranded aluminum cable, a coating or crust is formed that effectively insulates the wires from the solder so that the cable remains unsoldered. The problem involved in soldering stranded cables of aluminum metals is that the thickness of the flux film on each individual wire strand is critical. If it is too thick, there will not be sufficient heat transfer to the metal. If it is too thin, sufficient fluxing will not take place for good solder flow. Further, the flux should be characterized by good fluidity in order for the flux to properly coat each strand of the cable.

Accordingly, it is an object of this invention to provide a soldering flux with good fluidity, which facilitates solder flow and wherein corrosion problems are kept to minimum.

A further object of this invention is to provide an improved soldering flux in paste form for soldering aluminum metal articles.

A further object of this invention is to provide an improved soldering flux in liquid form for dip soldering aluminum metal articles.

A further object of this invention is to provide an improved soldering flux in liquid form for dip soldering stranded aluminum metal cables.

A further object of this invention is to provide a flux for soldering stranded aluminum metal cable which flux does not form an insulating coating or crust and yet will provide sufficient fluxing for good solder flow.

A further object of this invention is to provide an improved method of soldering aluminum articles.

These and other objects and advantages of the present invention will be better understood as the detailed description thereof progresses.

This invention is based on the finding that a mixture of a chloride of one of the elements of the group consisting of zinc, cadmium and tin; ammonium chloride; and at least one additional ammonium halide other than the chloride, when dissolved in a suitable solvent will result in an improved soldering flux suitable for soldering aluminum metal, particularly stranded cable. The choice of a solvent and the concentration of the salts in the solvent is selected such that when applied to aluminum cable a residue of the flux salts is left on the aluminum wires which will be of a proper thickness to permit sufficient heat transfer between the molten solder and aluminum wire to bring the wire to temperature. The dilution of this mixture in said solvents results in a solution having ammonium ions; ions selected from the group zinc, cadmium and tin; chloride ions; and ions of halogens other than chlorine. By the use of such a soldering flux, aluminum stranded cable can be readily soldered using conventional dip soldering techniques.

While the flux composition of the present invention is more particularly described with regard to its application in soldering stranded aluminum cable, this flux composition possesses other desirable applications, e.g., the soldering of aluminum can seams. While a solution of the flux composition can be utilized in these other applications, it has been found that it is desirable in certain instances from a practical operating standpoint to use the dry flux mixture of the invention in excess of that used in providing a saturated solution, thereby providing a paste which can be more easily handled for these applications.

The solvent employed for dissolving such a mixture must dissolve sufficient flux salts as pointed out above, to properly coat the metal surface upon its evaporation. In addition, the solvent must not react with the aluminum surface or the flux salts in such a manner as to interfere with the soldering action.

Further, the fluxing action of the material should not be impaired by gases that it may absorb from the atmosphere such as oxygen, and should also tolerate a reasonable amount of water which may be introduced by condensations from the air.

Numerous solvents have been tested and found to be successful in accomplishing these ideals. Examples of solvents tested and found satisfactory are methyl alcohol, ethyl alcohol, butyl alcohol, ethylene glycol, isoamyl alcohol, and butyl Cellosolve. Table I below sets forth examples of suitable concentration ratios and allowable moisture content of three of these solvents:

*Table I*

| Solvent | Usable Range of Concentration in Parts by Weight | Maximum Limit of Moisture, Parts by Weight Water per Saturated Solvent |
|---|---|---|
| Ethylene glycol | Saturated to 10 parts salts per 28 parts solvent. | 50/100 |
| Methanol | Saturated to 10 parts salts per 26 parts solvent. | 10/100 |
| Ethanol | Saturated to 10 parts salts per 24 parts solvent. | 125/100 |

The above tests were made using a 1/0 battery cable consisting of stranded aluminum having 0.012″ diameter strands, which cable was to be soldered to a terminal lug of open end construction. The cable was dipped in the liquid flux above described to allow coating of the cable. It was then removed and immersed in a molten 30% tin–70% zinc solder at a temperature of 750° F. for 11 seconds after which it was attached to the terminal lug.

In a preferred embodiment of this invention a mixture is made up of 6 to 9 parts by weight of ammonium chloride, and 0.1 to 1.5 parts by weight of ammonium bromide, said mixture generally being dissolved in a suitable solvent as above described.

In lieu of zinc chloride, stoichiometrically equivalent amounts of cadmium chloride or tin chloride may be employed. Similarly stoichiometrically equivalent amounts of ammonium iodide or ammonium fluoride may be employed in lieu of or in addition to ammonium bromide.

A specific example of one flux composition of the invention is one containing 7.5 parts by weight zinc chloride, 2.0 parts by weight ammonium chloride and 0.5 part by weight ammonium bromide dissolved in 25 parts by weight of methanol. Another specific example of a flux composition of the invention is one containing 7.7 parts by weight zinc chloride, 2.0 parts of weight ammonium chloride, 0.2 part by weight ammonium bromide and 0.1 part by weight ammonium fluoride dissolved in 25 parts by weight methanol. These fluxes, when heated, not only reacted with the aluminum metal surface to remove the oxide, but also provided excellent flow of solder metal and successfully soldered aluminum battery cable without presenting problems of corrosion of the cable at the point just beyond the solder covered portion or joint.

Further specific examples employing the above-mentioned equivalents are illustrated in Table II below, the concentrations being given in parts by weight.

*Table II*

| | | | |
|---|---|---|---|
| 14.0 CdCl₂ | 2.6 NH₄Cl | 0.7 NH₄Br | Ethylene glycol. |
| 14.0 SnCl₂ | 2.5 NH₄Cl | 0.7 NH₄Br | Acetone. |
| 7.6 ZnCl₂ | 1.9 NH₄Cl | 0.18 NH₄F | Methanol. |
| 7.6 ZnCl₂ | 1.9 NH₄Cl | 0.7 NH₄I | Methanol. |

All of these fluxes were used to successfully solder aluminum battery cable.

By comparison, a proprietary flux consisting of 25 grams of zinc chloride, 20 grams denatured alcohol, and 55 grams of water was tested. The flux did function in the removal of oxide, but the flow of solder was very poor.

While the specific embodiment of this invention employed in the comparative tests constitutes zinc chloride, ammonium chloride, ammonium bromide, and ammonium fluoride, various equivalents may be employed in lieu thereof as illustrated by way of example by Table II. The results of the tests in which the above equivalents were substituted for the preferred constituents of this invention were satisfactory.

This invention has been described with respect to the soldering of aluminum and its alloys for which purpose it is particularly well suited, but it can be used in the soldering of other metals such as copper and its alloys. It is also effective in the joining of dissimilar metals such as aluminum to copper or brass and aluminum to iron or steel.

While the above have been considered to be preferred embodiments of the invention, it will be understood by those skilled in the art that various changes and modifications may be made herein without departing from the spirit and scope thereof as claimed in the appended claims:

What is claimed is:

1. A soldering flux consisting essentially of
   (a) a chloride selected from the group consisting of zinc chloride, cadmium chloride and tin chloride, said chloride being present in an amount stoichiometrically equivalent to 6 to 9 parts by weight of zinc chloride,
   (b) 1 to 4 parts by weight of ammonium chloride, and
   (c) at least one halide selected from the group consisting of ammonium bromide, ammonium iodide and ammonium fluoride, said halide being present in an amount stoichiometrically equivalent to 0.1 to 1.5 parts by weight of ammonium bromide, and
   (d) a suitable solvent having the following properties
      (1) said solvent must dissolve sufficient flux salts to properly coat the metal to be soldered upon evaporation of said solvent,
      (2) said solvent must not react with the surface of the metal to be soldered in such a manner as to interfere with the soldering action, and
      (3) said solvent must not react with the flux salts in such a manner as to interfere with the soldering action.

2. The soldering flux of claim 1 wherein (a), (b) and (c) are as follows:
   (a) 7.7 parts by weight zinc chloride
   (b) 2.0 parts by weight ammonium chloride
   (c) 0.2 part by weight ammonium bromide and 0.1 part by weight ammonium fluoride.

3. The soldering flux of claim 1 wherein the constituents (a), (b) and (c) are mixed with the solvent (d) in such proportions that the quantity of dry flux mixture employed is substantially in excess of that necessary for providing a saturated solution, thereby providing a flux in paste form.

4. A soldering flux consisting essentially of
   (a) a chloride selected from the group consisting of zinc chloride, cadmium chloride and tin chloride, said chloride being present in an amount stoichiometrically equivalent to 6 to 9 parts by weight of zinc chloride,
   (b) 1 to 4 parts by weight of ammonium chloride, and
   (c) at least one halide selected from the group consisting of ammonium bromide, ammonium iodide and ammonium fluoride, said halide being present in an amount stoichiometrically equivalent to 0.1 to 1.5 parts by weight of ammonium bromide, and (d) a solvent selected from the group consisting of methyl alcohol, ethyl alcohol, butyl alcohol, ethylene glycol, iso-amyl alcohol, butyl Cellosolve and acetone.

5. A composition of matter consisting essentially of a solution of 7.5 parts by weight of zinc chloride, 2 parts by weight of ammonium chloride and 0.5 part by weight of ammonium bromide dissolved in 25 parts by weight of methanol.

6. A soldering flux consisting essentially of a solution of 14.0 parts by weight of cadmium chloride, 2.6 parts by weight of ammonium chloride and 0.7 part by weight of ammonium bromide, dissolved in ethylene glycol.

7. A soldering flux consisting essentially of a solution of 14.0 parts by weight of tin chloride, 2.6 parts by weight of ammonium chloride and 0.7 part by weight of ammonium bromide dissolved in acetone.

8. A soldering flux consisting essentially of a solution of 7.6 parts by weight of zinc chloride, 1.9 parts by weight of ammonium chloride and 0.18 part by weight of ammonium fluoride dissolved in methanol.

9. A soldering flux consisting essentially of a solution of 7.6 parts by weight zinc chloride, 1.9 parts by weight of ammonium chloride, and 0.7 part by weight of ammonium iodide dissolved in methanol.

10. A soldering flux consisting essentially of a solution of 7.7 parts by weight zinc chloride, 2.0 parts by weight ammonium chloride, 0.2 part by weight ammonium bromide and 0.1 part by weight ammonium fluoride dissolved in methanol.

11. A method of soldering stranded aluminum cable which comprises the steps of dipping the end of said cable in a soldering flux consisting essentially of (a) a chloride selected from the group consisting of zinc chloride, cadmium chloride and tin chloride, said chloride being present in an amount stoichiometrically equivalent to 6 to 9 parts by weight of zinc chloride, (b) 1 to 4 parts by weight of ammonium chloride, and (c) at least one halide selected from the group consisting of ammonium bromide, ammonium iodide and ammonium fluoride, said halide being present in an amount stoichiometrically equivalent to 0.1 to 1.5 parts by weight of ammonium bromide, and (d) a suitable solvent having the following properties (1) said solvent must dissolve sufficient flux salts to properly coat the metal to be soldered upon evaporation of said solvent, (2) said solvent must not react with the surface of the metal to be soldered in such a manner as to interfere with the soldering action, and (3) said solvent must not react with the flux salts in such a manner as to interfere with the soldering action, removing said cable end from said soldering flux and immersing it in a molten solder bath followed by joining the cable end to the object to which it is to be soldered.

12. A method of soldering stranded aluminum cable which comprises the steps of dipping the end of said cable in a soldering flux consisting essentially of a solution of 6 to 9 parts by weight of zinc chloride, 1 to 4 parts by weight of ammonium chloride and 0.1 to 1.5 parts by weight of ammonium bromide dissolved in methanol, removing said cable end from said soldering flux and immersing it in a molten solder bath followed by joining the cable end to the object to which it is to be soldered.

13. A method of soldering stranded aluminum cable which comprises the steps of dipping the end of said cable in a soldering flux consisting essentially of a solution of 7.7 parts by weight zinc chloride, 2.0 parts by weight ammonium chloride, 0.2 part by weight ammonium bromide and 0.1 part by weight ammonium fluoride dissolved in methanol, removing said cable end from said soldering flux and immersing it in a molten solder bath followed by joining the cable to the object to which it is to be soldered.

References Cited in the file of this patent

UNITED STATES PATENTS

| | | |
|---|---|---|
| 1,744,784 | McDonough et al. | Jan. 28, 1930 |
| 1,914,269 | Liban | June 13, 1933 |
| 1,960,239 | Callis et al. | May 29, 1934 |
| 2,179,258 | Howarth | Nov. 7, 1939 |
| 2,379,234 | Horowitz | June 26, 1945 |
| 2,505,627 | Pessel | Apr. 25, 1950 |
| 2,548,690 | Vieno | Apr. 10, 1951 |
| 2,781,577 | Smellie | Feb. 19, 1957 |

FOREIGN PATENTS

| | | |
|---|---|---|
| 315,010 | Great Britain | July 8, 1929 |
| 316,196 | Great Britain | June 5, 1930 |
| 413,141 | Great Britain | July 12, 1934 |
| 472,582 | Great Britain | Sept. 27, 1937 |
| 642,869 | Great Britain | Sept. 13, 1950 |

UNITED STATES PATENT OFFICE
CERTIFICATE OF CORRECTION

Patent No. 3,074,158

January 22, 1963

Walter D. Finnegan

It is hereby certified that error appears in the above numbered patent requiring correction and that the said Letters Patent should read as corrected below.

Column 1, line 37, for "loose" read -- loosen --; column 3, line 40, after "of", second occurrence, insert -- zinc chloride, 1 to 4 parts by weight of --; line 56, for "2.0 parts of weight" read -- 2.0 parts by weight --.

Signed and sealed this 3rd day of September 1963.

(SEAL)
Attest:

ERNEST W. SWIDER
Attesting Officer

DAVID L. LADD
Commissioner of Patents